United States Patent [19]

Bowling et al.

[11] Patent Number: 5,374,433
[45] Date of Patent: Dec. 20, 1994

[54] METHOD FOR PRESERVING FOOD PRODUCTS

[75] Inventors: Rod A. Bowling, Downingtown, Pa.; Robert P. Clayton, Kersey, Colo.

[73] Assignee: Monfort, Inc., Greeley, Colo.

[21] Appl. No.: 796,052

[22] Filed: Nov. 20, 1991

[51] Int. Cl.$^5$ .............................................. A23L 3/00
[52] U.S. Cl. .......................................... 426/8; 426/55; 426/61; 426/324; 426/332
[58] Field of Search ................ 426/8, 61, 43, 56, 324, 426/332, 7, 32, 55, 59, 321, 331

[56] References Cited

U.S. PATENT DOCUMENTS

| | | | |
|---|---|---|---|
| 273,094 | 2/1893 | Jennings . | |
| 3,915,889 | 10/1975 | Jurd et al. | 252/404 |
| 3,934,044 | 1/1976 | Busch et al. | 426/326 |
| 3,991,218 | 11/1976 | Earle et al. | 426/250 |
| 4,045,579 | 8/1977 | Rogers | 426/327 |
| 4,147,807 | 4/1979 | Gryczka et al. | 426/56 |
| 4,309,795 | 1/1982 | Simonsen | 17/47 |
| 4,674,152 | 6/1987 | Georges | 17/47 |
| 4,837,036 | 6/1989 | Baker et al. | 426/43 |
| 4,852,216 | 8/1989 | Clayton et al. | 17/50 |
| 4,894,243 | 1/1990 | Ahrné | 426/61 |

OTHER PUBLICATIONS

Fennema, O. R., 1985, Food Chemistry, pp. 781–782, Mariel-Dekker, Inc., New York.
Ahn et al., "Antibacterial activity of lactic acid bacteria isolated from vacuum-packaged meats", pp. 302–310, 1990, Journal of Applied Bacteriology, vol. 69.
Bacus, "Update: Meat Fermentation 1984", pp. 59–63, 1984, Food Technology.
Berry et al., "Inhibition of *Listeria monocytogenes* by Bacteriocin-Producing Pediococcus During the Manufacture of Fermented Semidry Sausage", pp. 194–197, 1990, J. Food Protect., vol. 53.
Gilliland, "Role of Starter Culture Bacteria in Food Preservation" in *Bacterial Starter Cultures for Foods*, CRC Press, pp. 176–185, 1985, Chapter 13.
Harris et al., "Antimicrobial Activity of Lactic Acid Bacteria Against *Listeria monocytogenes*", pp. 384–387, 1989, J. Food Protect., vol. 52.
Klaenhammer, "Bacteriocins of lactic acid bacteria", pp. 337–349, 1988, Biochimie, vol. 70.
Okereke et al., "Bacteriocin Inhibition of *Clostridium botulinum* Spores by Lactic Acid Bacteria", pp. 349–353, 1991, J. Food Protect., vol. 54.
Schillinger et al., "Antibacterial Activity of *Lactobacillus sake* isolated from Meat", pp. 1901–1906, 1989, Microbio., vol. 55.
Spelhaug et al., "Inhibition of Foodborne Bacterial Pathogens by Bacteriocins from *Lactococcus lactis* and *Pediococcus pentosaceous*", pp. 856–862, 1989, J. Food Protect., vol. 52.
"Inoculation of Beef Steaks with Lactobacillus Species Before Vacuum Packaging. I. Microbiological Considerations", by Hanna et al., Journal of Food Protection, vol. 43, pp. 837–841 (1980).

(List continued on next page.)

Primary Examiner—Donald E. Czaja
Assistant Examiner—Leslie Wong
Attorney, Agent, or Firm—Sheridan Ross & McIntosh

[57] ABSTRACT

A method for preserving a food product, such as meat, is provided. The method comprises the steps of inoculating meat with an effective amount of euhygienic non-pathogenic, non-spoilage bacteria in order to competitively inhibit the growth of undesired pathogenic and spoilage bacteria. Preferably, either *L. delbrueckii* or *Hafnia alvei* bacteria are used to inoculate a meat product. Bacteria present on a meat product is first reduced to a number below about 5000 bacteria per gram of meat, e.g. by dehairing an animal and then spraying the meat with an organic acid prior to inoculation with euhygienic bacteria. The meat product is then vacuum packaged and stored in a refrigerated environment of about −1° C. to about 7° C. Meat products preserved in accordance with the method of the invention can enjoy a refrigerated shelf life of up to about 150 days without surface discoloration or the generation of undesirable gaseous by-products.

5 Claims, No Drawings

OTHER PUBLICATIONS

"Inoculation of Beef Steaks with Lactobacillus Species Before Vacuum Packaging. II. Effect on Meat Quality Characteristics", by Smith et al., Journal of Food Protection, vol. 43, pp. 842–849 (1980).

"Significance of Lactobacilli and Film Permeability in the Spoilage of Vacuum-Packaged Beef" by Egan et al., Journal of Food Science, vol. 47, pp. 1119–1126 (1982).

"Use of Microbial Cultures: Meat Products", by Bacus et al., Food Technology, Jan., pp. 74–83 (1981).

"Antimicrobial Substances from Lactic Acid Bacteria for Use as Food Preservatives", by Daeschel, Food Technology, Jan., pp. 164–167 (1989).

"Microorganisms as Food Additives", by Smith et al., Journal of Food Protection, vol. 44, pp. 936–955 (1981).

"Use of Starter Cultures in Meats" by Smith et al., Journal of Food Protection, vol. 46, pp. 997–1006 (1983).

"Bacterial Starter Cultures for Foods", by Gilliland, CRC Press, Inc., pp. 176–185 (1985).

"The Influence of Lactic Cultures on Ground Beef Quality", by Reddy et al., Journal of Food Science, vol. 35, pp. 787–794 (1970).

"Lactic Acid Bacteria as an Antispoilage and Safety Factor in Cooked, Mechanically Deboned Poultry Meat", by Raccach et al., Journal of Food Protection, vol. 41, pp. 703–705 (1978).

"Potential Application of Microbial Antagonism to Extended Storage Stability of a Flesh Type Food", by Raccach et al., Journal of Food Science, vol. 44, pp. 43–46 (1979).

"The Influence of Lactic Cultures on Ground Beef Quality", by Reddy et al., Journal of Food Science, vol. 35, pp. 787–791 (1970).

"Influence of Lactic Cultures on the Biochemical, Bacterial and Organoleptic Changes in Beef", by Reddy et al., Journal of Food Science, vol. 40, pp. 314–318 (1975).

"Inhibition of Psychrotrophic Bacteria by Lactobacilli and Pediococci in Nonfermented Refrigerated Foods", by Gilliland et al., Journal of Food Science, vol. 40, pp. 903–905 (1975).

"Effects of Degree of Sanitation From Slaughter Through Fabrication on the Microbiological and Sensory Characteristics of Beef" by Dixon et al., Journal of Food Protection, vol. 54, pp. 200–207 (1991).

"Inhibition of Food-Borne Bacterial Pathogens by Bacteriocins from Lactic Acid Bacterial Isolated From Meat", by Lewus et al., Applied Environmental Microbiology, vol. 57, pp. 1683–1688 (1991).

"Use of Conductance to Detect Bacteriocin Activity" by Giraffa et al., Journal of Food Protection, vol. 53, pp. 772–776 (1990).

"Effect of Lactobacilli and Carbon Dioxide on the Growth of *Microbacterium thermosphactum* on Fresh Beef", by Roth et al., Can. J. Microbiol., vol. 21, pp. 629–632 (1975).

METHOD FOR PRESERVING FOOD PRODUCTS

FIELD OF THE INVENTION

This invention relates to a method for preserving food products, and particularly meat and meat by-products and food products produced thereby. More particularly this invention relates to a method for preparing a meat product having a shelf life of up to 150 days by dehairing an animal, removal of the hide of the animal, contacting the animal carcass with weak organic acids, and inoculating meat with euhygienic bacteria to competitively inhibit and/or exclude the growth of undesired pathogenic and spoilage bacteria.

BACKGROUND OF THE INVENTION

In the meat industry, and particularly in those areas devoted to the processing of beef and pork, meat packers slaughter animals in a process in which the animals are stunned, bled, skinned, eviscerated, and fabricated into meat sections which are then marketed in grocery stores and in the restaurant trade. Animals enter a meat slaughter plant with various foreign materials present on their hair, including blood, dirt, manure, mud, and vegetative material. An animal's hair is also contaminated with a multitude of microorganisms, some of which are pathogenic to humans. Most bacteria present in a meat slaughtering and processing facility are carried into the facility on the hides of animals to be slaughtered. During the slaughtering process these microorganisms contact meat and other meat by-products, thereby contaminating such products, creating handling problems and reducing the shelf life and safety of the meat products.

The control of contamination by microorganisms is a recognized problem in the meat packing industry. The preparation of food products, and particularly fresh meat and meat products for the retail market, is largely concerned with the control of microbial contact with food in order to increase the shelf life of food products. Food products having an extended shelf life afford more time in which handlers, shippers, and wholesalers can transport and sell such food before spoilage occurs. Efforts to increase the shelf life of food products, such as meat, have traditionally been focused on reducing the number of bacteria present on the surface of the food product.

Freezing food, and particularly meat, has proven to be an effective way in which to retard the growth of bacteria that may be present on the surface of the food. The freezing of meat, however, especially for extended periods of time, has many undesirable effects. By freezing a meat product, water within the meat crystallizes, causing the denaturing of proteins and other damage to the meat on a cellular level. Moreover, the texture, consistency and taste of thawed frozen meat is less desirable than that of fresh meat. Because of the relative short shelf life of fresh meat, foreign markets can only be reached by freezing domestic meat products. Many foreign meat consumers, such as those in the Pacific rim countries and Europe, prefer fresh meat to frozen meat. Such fresh meat preference effectively preclude foreign sales of domestic meat. Without freezing the meat product, however, the bacteria that has contacted the meat during processing are able to proliferate, creating spoilage and pathogenic concerns.

The opportunity for bacterial contact with the fresh meat begins when an animal is initially presented for processing and extends up until the time the meat product is consumed. The initial bacterial contact with fresh meat is encountered with a meat processing facility due to the contaminated state of the animal when it enters the facility. Further opportunities for bacterial contact arise from the significant amount of human handling and equipment exposure during the slaughter, processing, and transportation of meat products. Moreover, when consumers remove the wrapping of a meat product for cooking, additional opportunities present themselves for bacterial infection.

The time between the initial opportunity for bacterial contact with meat products and the ultimate consumption of such products by consumers, allows for the proliferation of various forms of bacteria, including the growth of undesired spoilage and pathogenic bacteria. The growth of undesired bacteria on meat presents aesthetic concerns affecting the marketability of meat products. For example, growth of spoilage bacteria creates undesired odors due to bacterial production of certain esters, hydrogen sulfide, nitrogenous compounds, ruturic acid, propionic acid, formic acid, as well as other undesirable gases and acids. The growth of other such bacteria also acts to discolor the surface of the meat. Moreover, when meat packaged in permeable plastic packages spoils, the packaging often inflates due to the generation of gas produced by spoilage bacteria.

Contamination of meat with pathogenic bacteria is also a great concern since such bacteria, or toxins produced by such bacteria, can cause illness or disease in humans and animals who consume such meat. The shelf life of a meat product is directly related to the number of spoilage and pathogenic bacteria present on the surface of the meat product. A meat product having a high level of spoilage and pathogenic bacteria on its surface exhibits a relatively short shelf life, whereas meat having a low count of spoilage and pathogenic bacteria exhibit an extended shelf life.

There has been a long felt need in the meat packaging industry for controlling undesired bacterial proliferation in order to avoid spoilage and thereby increase the shelf life of meat products. Government standards also mandate that meat processing facilities attain certain tolerances which have been set regarding the number of potentially hazardous bacteria that meat may contain. Methods by which undesired bacterial growth on meat can be controlled are therefore desired.

In a meat processing facility, animals are slaughtered and fabricated in a process which progressively disassembles the animal to produce meat cuts for sale to customers. When an animal to be slaughtered enters a processing facility, it typically has a great variety of bacteria present on its hide. Bacteria present on an animal primarily originate from the foreign material present on an animal's hide, including blood, dirt, manure, mud and vegetative material. The necessary handling of meat products during the fabrication process provides additional opportunities for meat to come into contact with bacteria. In conventional meat processing facilities, it has not been economically feasible to remove all sources of material contact with the meat or to maintain perfect environmental conditions to retard bacterial growth.

The prior art utilizes several methods to prolong the retail acceptability of meat products. For example, vacuum packing of meat in gas permeable packages is commonplace. Irradiation with ultraviolet light has been used to reduce the number of microorganisms on meat surfaces. Salting of meat has long been practiced to preserve meat products. Refrigeration is also widely used to deter the rapid growth of spoilage and pathogenic bacteria on meat products. Spoilage bacteria, such as pseudomonas, are known to grow most rapidly at about room temperature. Although such bacteria are present on meat at lower temperatures, their growth is significantly slowed by cooler environments. Mere refrigeration alone, however, is not totally effective in preventing or adequately retarding the growth of spoilage or pathogenic bacteria for any appreciable amount of time.

The shelf life of meat has also been extended somewhat by the use of chemical agents. Chemical treatment of meat to destroy surface bacteria has traditionally been accomplished by treating meat with weak acids and/or chlorine solutions. These conventional techniques, however, often create undesirable color, flavor and order modifications of meat, and are often ineffective to maintain meat in a saleable condition for any appreciable period of time.

Although the control of spoilage and pathogenic bacterial growth is a recognized problem in the meat packing industry, the reduction of meat shelf life attendant to such growth continues to be a significant problem. Many techniques have been employed in the past in an effort to destroy surface bacterial flora on meat. For example, U.S. Pat. No. 4,852,216 to Clayton discloses a disinfection system using an acetic acid spray in order to reduce bacterial levels and thereby increase shelf life of meat products. Similarly, U.S. Pat. No. 3,924,044 to Busch discloses a method for applying a hot, dilute acid solution to meat surfaces to destroy psychotropic spoilage bacteria on meat surfaces. U.S. Pat. No. 3,991,218 teaches the encapsulation of meat products in a film of alginate material to retard the growth of anaerobic bacteria on the surface of the meat. Other inventors have utilized anti-microbial agents for preserving products normally subject to microbial spoilage. For example, U.S. Pat. No. 3,915,889 to Jurd discloses a certain anti-microbial agent that can be applied for preservation for a wide variety of substances including meat.

Other inventors have recognized the advantages of dehairing animals to facilitate the slaughtering process. U.S. Pat. No. 4,674,152 to Georges discloses an apparatus and method for slaughtering animals by bleeding an animal, electrostatically charging the animal's hair, applying a combustible fluid to the hair and subsequently igniting the combustible fluid to burn the hair from the animal's body. U.S. Pat. No. 4,309,795 to Simonsen discloses a method and apparatus for de-hairing hogs wherein the hog is bled, its skin is scalded with hot water, and then subjected to abrasive treatment to remove the hogs hair.

In a direct teaching away from the present invention, other researchers have concluded that contacting meat products with lactic acid bacteria, and thereafter vacuum packaging such meat in impermeable plastic, is ineffective in controlling the growth of pathogenic and spoilage bacteria on the meat. For example, the companion articles by Hanna et al., "Inoculation of Beef Steaks with Lactobacillus Before Vacuum Packaging, I. Microbiological Considerations," Journal of Food Protection, Vol. 43, pp. 837-841 (November 1980) and Smith, G. C. et al., "Inoculation of Beef Steaks with Lactobacillus Species Before Vacuum Packaging. II. Effect on Meat Quality Characteristics," Journal of Food Protection, Vol. 43, pp. 842-849 (November 1980) disclose that disadvantages outweigh advantages for inoculation of beef with Lactobacillus cultures prior to vacuum packaging of meat. In addition, Egan et al., "Significance of Lactobacilli and Film Permeability in the Spoilage of Vacuum-Packaged beef," Journal of Food Science, Vol. 47, pp. 119-126 (1982) disclose that even in the absence of a significant population of contaminating microorganisms, sterile vacuum packaged beef has a limited shelf life and the addition of Lactobacillus bacteria to vacuum packaged meat increases the rate of spoilage. Therefore, no prior art techniques have taught the effective elimination of growth of undesired bacteria to achieve a significant extension of shelf life in fresh meat products.

In the meat packing industry, many types of bacteria are known to cause food poisoning including: E. coli, Salmonella, F. coliforms, Listeria, Staphylococcus, F. streptococcus, Bacillus anthraces, Balantidium coli, Campylobacter coli, Campylobacter jejune, Francisella tularensis, Sarcocystis, Taenia saginata, Taenia solium, Toxoplasma gondil, Trichinella spiralis, Yersinia enterocolinea, Yersinia pseudotuberculosis, Brucella, Chlamydia petechia, Leptospira and Clostridium. These pathogenic bacteria each group and proliferate under different conditions, any or all of which may be present in a meat processing facility. For example, Listeria is generally found in cool, damp environments such as coolers and meat processing areas. Staphylococcus is often found on cattle hair, in fecal material, in infected cuts and internal abscesses, and is sometimes associated with poor hygienic practices of food handlers.

Spoilage bacteria, including psychotropic bacteria such as Pseudomonades, Lactobacillus and Coliform, affect the shelf life of meat products by causing discoloration of meat and undesired odors. These bacteria are typically found in soil, ingesta, and fecal material that are commonplace on an animal's hide.

The bacteria present on an animal's hide can be roughly divided into three distinct categories: pathogenic bacteria, lactic bacteria, and spoilage bacteria. In the environment of a meat processing facility, spoilage bacteria typically proliferate at a greater rate than do pathogenic bacteria or lactic bacteria. It has been recognized that various sanitizing techniques, including acetic acid sprays, application of anti-microbial agents, and irradiation, can be used to reduce the total number of bacteria present on an animal carcass. However, while the total number of bacteria can be reduced, it is difficult to specifically kill pathogenic and spoilage bacteria without eliminating all the bacteria present on an animal carcass.

Additional difficulties are experienced in the control of certain types of bacteria, namely Salmonella and Listeria, which initially infect meat by implanting themselves on meat surfaces. After contact, such bacteria immediately initiate the secretion of a waxy material to protect themselves from the outside environment. Unless these bacteria are contacted with chemical agents, such as acetic acid, before significant implantation and secretion of waxy substances, such bacteria are extremely difficult to remove from the meat.

Conventional wisdom in the meat processing industry teaches the maintenance of low bacterial counts as measured by the total number of bacteria on a meat product. For example, if bacterial counts exceed about ten million bacteria per gram of meat, the meat is disposed of as a matter of course. However, a total bacterial count includes not only the number of pathogenic and spoilage bacteria, but also non-pathogenic, non-spoilage bacteria.

In view of the above, a need exists for a method for preserving food products, particularly fresh meat and meat by-products, by selectively reducing the number of spoilage and pathogenic bacteria present on such food products.

SUMMARY OF THE INVENTION

The present invention includes a method for preserving food products, such as meat, by inoculating such food products with an effective amount of euhygienic bacteria. Euhygienic bacteria are non-pathogenic and/or non-spoilage bacteria able to competitively inhibit and/or exclude the growth of pathogenic and spoilage bacteria. The euhygienic bacteria used in the present invention create essentially no malodors or discoloration of food products, such as meat, and thus act to extend the shelf life of foods products. The present invention specifically is applicable to the preservation of meat from poultry, beef, pork, lamb, fish and seafood, as well as to dairy products, vegetables, fruits and grains.

In one embodiment of the invention, euhygienic bacteria are preferably facultative, sacrophilic, gram positive bacteria, and more preferably bacteria of the genus Lactobacillus. Euhygienic bacteria are preferably obligately homofermative lactobacilli but can also be facultatively heterofermentive lactobacilli.

In another embodiment of the invention, euhygienic bacteria include *Lactobacillus delbrueckii, L. leichmannii, L. jensenii, L. lactis, L. bulbaricus, L. helveticus* or *L. acidophilus*. In a preferred embodiment of the invention the euhygienic bacteria are predominately of the species *L. delbrueckii* or *Hafnia alvei,* or a combination of *L. delbrueckii* and *Hafnia alvei.*

In accordance with one embodiment of the present invention, a food product is inoculated with euhygienic bacteria able to proliferate at temperatures from about −1 C. to about 35° C. Another embodiment involves reducing the number of bacteria present on a food product, preferably below about 5000 bacteria per gram of food product, prior to inoculation with an effective amount of euhygienic bacteria. Inoculation of a food product is performed prior to packaging of the food product, preferably with impermeable plastic wrapping. In one embodiment of the present invention freeze dried euhygienic bacteria are placed inside a food package prior to sealing of the package. Reduction of the number of bacteria on a food product may be accomplished in various ways including irradiating the food, exposing the food to elevated temperatures, contacting the food with antibiotics, or contacting the food with an organic acid such as lactic or acetic acid.

In yet another embodiment of the invention, the surface of a food product is inoculated with *Hafnia alvei* bacteria. *Hafnia alvei* bacteria are believed to initially colonize the meat surface and create an environment conducive to the growth of *L. delbrueckii* bacteria. The subsequent or coincidental inoculation of the meat with *L. delbrueckii* competitively inhibits and/or excludes the growth of undesired pathogenic and spoilage bacteria.

The present invention also includes the adjustment of the pH on the surface of meat to create an environment conducive to the growth of euhygienic bacteria. In one embodiment of the invention, meat is contacted with lactic or acetic acid to establish a meat surface pH of about 4 to about 7, and more preferably to between about 4 and 5, permitting the selective growth of euhygienic bacteria, such as *L. delbrueckii* or *Hafnia alvei,* over the growth of pathogenic and spoilage bacteria.

In another embodiment, an animal carcass, or meat therefrom, is inoculated with euhygienic bacteria after application to the carcass of an organic acid, such as acetic or lactic acid, and prior to the vacuum packaging of the meat in oxygen impermeable wrapping.

A further embodiment of the method includes maintaining an animal carcass or meat therefrom at a temperature of about −1° C. to about 7° C. after inoculation with an euhygienic bacteria. In alternative embodiments, the total number of bacteria present on an animal carcass is reduced and the animal carcass is inoculated with an effective amount of euhygienic bacteria able to produce antibiotics toxic to pathogenic and spoilage bacteria.

The present invention also includes food products prepared in accordance with the above mentioned method. Specifically, in one embodiment of the invention a meat product is produced having a shelf life of over about 40 days and up to about 150 days with its surface primarily populated with euhygienic bacteria.

Other embodiments of the invention are directed to the reduction of malodors, and/or discolorations of food products, the inhibition of undesired bacterial growth on food products, and the tenderizing of meat products by inoculating food or meat products with an effective amount of euhygienic bacteria. Another embodiment of the invention includes the effective reduction of the growth of spoilage and pathogenic bacteria within a food processing facility by inoculating the food processing facility and/or equipment therein, with an effective amount of euhygienic bacteria.

DETAILED DESCRIPTION OF THE INVENTION

In the preparation of a food product, and particularly a meat product, for animal or human consumption, one of the paramount concerns is to reduce the number of bacteria present on the surface of the food product. The reason bacterial control on a food product is so important is that certain types of bacteria, namely pathogenic and spoilage bacteria, shorten the shelf life of food products by multiplying on food surfaces, thereby generating undesired by-products that cause malodors, discoloration or poisoning of the food.

The term "food product" as used herein refers to any food that is susceptible to spoilage as a result of bacterial growth and proliferation on the surface of the food. Such food products include, but are not limited to meat, vegetables, fruits and grains.

As used herein, the term "meat" refers to any fresh meat product or meat by-product from an animal of the kingdom Animalia which is consumed by humans or animals, including without limitation meat from bovine, ovine, porcine, poultry, fish and crustaceous seafood. Thus, while one of the primary uses for the present invention relates to meat processed in the slaughtering of mammals in a meat processing facility, it is to be expressly understood that the invention has application in the processing of other edible meat products including fish, poultry and seafood. Moreover, it is contemplated that the method also will have use in connection with the preservation of non-animal food products, such as fruits, vegetables and grains, subject to spoilage by bacterial microorganisms.

As used herein the term "shelf life" means the period of time that a food product remains saleable to retail customers. In traditional meat processing, the shelf life of fresh meat and meat by-products is about 30 to 40 days after an animal has been slaughtered. Refrigeration of meat during this period of time largely arrests and/or retards the growth of pathogenic bacteria, and to a lesser extent, spoilage bacteria. After about 30 to 40 days, however, refrigeration is no longer able to effectively control the proliferation of spoilage bacteria below acceptable levels. Spoilage bacteria present on meat products after this time period are able to assimilate proteins and sugars on meat surfaces and begin to generate undesired by-products. Spoilage bacteria may also act to discolor meat, making such meat unappealing and undesirable for human consumption.

The term "spoilage bacteria" as used herein refers to any type of bacteria that acts to spoil food. Spoilage bacteria may grow and proliferate to such a degree that a food product is made unsuitable or undesirable for human or animal consumption. Bacteria are able to proliferate on food surfaces, such as meat surfaces, by assimilating sugars and proteins on such surfaces. By metabolizing these components, spoilage bacteria create by-products including carbon dioxide, methane, nitrogenous compounds, butyric acid, propionic acid, lactic acid, formic acid, sulfur compounds, and other undesired gases and acids. The production of such by-products alters the color of meat surfaces, often turning meat from a red color to a brown, grey or green color. Gaseous by-products generated by spoilage bacteria also give spoiled meat an undesirable odor. The color and odor alterations of meat due to the growth of spoilage bacteria on a meat product's surface often makes such meat unsalable to consumers.

In addition to the control of spoilage bacteria, another significant concern in the food processing industry is controlling the growth of pathogenic bacteria. As used herein, the term "pathogenic bacteria" refers to any food poisoning organism that is capable of causing disease or illness in animals or humans. The term pathogenic bacteria will be understood to include bacteria that infect meat and thereby cause disease or illness, as well as bacteria that produce toxins that cause disease or illness. The proliferation of pathogenic bacteria on food products can cause severe illness and may be deadly, as demonstrated by the number of human fatalities caused by botulism. The term "undesired bacteria" as used herein, refers to both spoilage and pathogenic bacteria. For purposes of illustration only and without being limited thereby, the term "undesired bacteria" includes obligately heterofermentative Lactobacilli. Such bacteria ferment hexoses to lactic acid, acetic acid, ethanol and $CO_2$ and are also known to ferment pentoses to lactic acid and acetic acid.

Pathogenic and spoilage bacteria can be aerobic, anaerobic or facultative, and thus, the elimination of oxygen alone from a food package or from a food storage environment will not effectively eliminate all types of undesired bacteria. Moreover, control of the temperature in the storage of food is not totally effective to preclude the growth of such bacteria because several types of pathogenic and spoilage bacteria are able to grow at various temperatures. While exposure to very high temperatures is known to be effective in killing most bacteria, such exposure may damage at least a portion of a food product by essentially cooking the food. High temperatures may also act to denature enzymes necessary for desired aging of meat products. Moreover, certain pathogenic bacteria produce toxins that are not destroyed by exposure to elevated temperatures. Thus, raising the temperature of food is not a practical way in which to effectively eliminate the negative effects of pathogenic bacterial contamination of a food product.

Conventional practice in the meat processing industry teaches that the less bacteria present on a meat product, the safer such meat product will be for human consumption. Attempts have thus been made to essentially sterilize the surface of meat to control bacterial growth thereon. As used herein, the term "sterilize" refers to the significant reduction of the number of bacteria from the surface of a food product. In a more specific sense, the term means effectively de-populating a food product's surface of bacteria. In one embodiment of the invention, the number of undesired bacteria on a food product is reduced to below about 5000 bacteria per gram of food product. Conventional methods for sterilizing food products, such as meat, include contacting meat with weak organic acids, applying anti-biotic substances to meat, exposing meat to high temperatures and irradiating meat with high frequency radiation or x-rays. These and other methods can be used in conjunction with the present invention to substantially reduce the number of bacteria present on meat products. Such other methods include de-hairing of an animal prior to dispatching of the animal to remove microorganisms associated with the animal's hair. One preferred method of de-hairing an animal, and thereby vastly reducing the number of bacteria on the animal's hide, is to contact a depilatory substance to an immobilized animal and subsequently to remove its hair prior to the slaughtering of the animal.

While effective in reducing the number and kinds of bacteria on food products such as meat, the above-mentioned methods are not able to continuously control the growth of spoilage and pathogenic bacteria. For example, by sterilizing an animal carcass, post-sterilization bacterial contact of the animal carcass by indigenous bacteria, including pathogenic and spoilage bacteria, is still possible. When a meat product is essentially rid of all forms of bacteria, pathogenic and spoilage bacteria present in the ambient environment have a new opportunity to colonize the animal carcass. Thus, once an animal carcass has been sterilized, it has traditionally been of utmost importance to maintain a sterile environment to preclude the opportunity for additional contact of the meat by undesired bacteria.

Maintenance of an essentially sterile environment within a meat packing facility, however, is practically impossible using current technology. As such, a method is needed that can preclude the growth of pathogenic and spoilage bacteria subsequent to the effective sterilization of an animal carcass. The present invention fulfills this need by inoculating meat of an animal with a desired euhygienic, non-pathogenic, non-spoilage bacteria, immediately after the animal has been de-haired, had its hide removed, and sterilized. In such a manner, euhygienic bacteria are able to colonize the animal carcass and thereby competitively inhibit and/or exclude the growth of undesired pathogenic and spoilage bacteria.

As used herein, the term "euhygienic bacteria" generally refers to a hygienic control bacteria that does not generate a significant or unacceptable amount of undesired by-products during its growth and proliferation. The term "euhygienic bacteria" is therefore understood to include non-spoilage bacteria as well as non-pathogenic bacteria. The term also includes any bacteria that may be genetically altered to delete or otherwise ameliorate qualities that would effect the salability and/or edibility of a food product, including without limitation bacteria altered to reduce production of carbon dioxide, methane, nitrogenous compounds, sulfur compounds, propionic acid, butyric acid, formic acid, as well as other undesirable compounds.

Euhygienic bacteria are preferably obligately homofermentative lactobacilli that ferment hexoses almost exclusively to lactic acid by the Embeden-Meyerhof pathway. A preferred embodiment of euhygienic bacteria do not ferment gluconate or penroses.

Another type of euhygienic bacteria is classified as a facultatively heterofermentative lactobacilli. This class of euhygienic bacteria ferment hexoses almost exclusively to lactic acid by the Embeden-Meyerhof pathway. In addition, some species of euhygienic bacterial ferment hexoses to lactic acid, acetic acid, ethanol and formic acid under glucose limitation, and are known to ferment pentose to lactic acid and acetic acid via an inducible phosphoketolase. In one embodiment of the present invention, euhygienic bacteria are facultative, sacrophilic gram positive bacteria that do produce minimal undesirable by-products during growth and proliferation.

The term "inoculation" as used herein, refers to any method for effectively contacting bacteria to a surface so that such bacteria can proliferate on such surface. The surface of food products such as meat, as well as surfaces of food processing equipment, may be inoculated in any manner which effectively contacts desired bacteria to such surfaces. Such inoculation methods may include, but are not limited to, spraying a surface, such as an animal carcass, with effective amounts of, or immersing an animal carcass in, a solution containing desired euhygienic bacteria. Inoculation of meat can also be performed by placing an effective quantity of freeze dried euhygienic bacteria into a plastic bag with a meat product. The bag can then be evacuated of air and the moisture from the meat can then re-hydrate the freeze-dried bacteria, thereby allowing bacterial colonization of the meat. The general goal common to all inoculation methods is to contact a surface with a sufficient quantity of euhygienic bacteria to colonize that surface and thereby inhibit and/or exclude the growth of undesired bacteria thereon. Inoculation of ground food products, such as ground beef, may be accomplished by contacting the food product with euhygienic bacteria before, after, or during the grinding of the food products.

Euhygienic bacterial solutions can be prepared in acceptable amounts and under appropriate environmental conditions, such preparation dependent upon various factors, such as the specific type of euhygienic bacteria used, the food product to be inoculated and the type of undesired bacteria to be inhibited and/or excluded. For example, an effective solution for inoculating meat with the euhygienic bacteria *L. delbrueckii* may be prepared by growing a culture of the euhygienic bacteria in a flask at a suitable temperature, e.g. about 35° C. for approximately 24 hours. The solution can then be diluted with suitable medium and applied to the meat. Dilution of euhygienic bacterial solutions prior to application is also dependent upon the factors listed above, with the general goal being the effective inoculation of a food product with euhygienic bacteria able to competitively inhibit the growth of undesired bacteria. In one embodiment, for example, an euhygienic bacterial solution is diluted to approximately one part of bacterial broth grown in the above-described manner for every ten parts of additional media.

Preferably, euhygienic bacteria are applied to a food product during the logarithmic growth phase of such bacteria. Therefore, euhygienic bacterial solutions should be formulated so that there is an ample food source available to support continued euhygienic bacterial growth and proliferation. A preferred food source media or broth for euhygienic bacteria comprises a mixture of simple and complex carbohydrates including but not limited to glycerol, ribose, galactose, D-glucose, D-fructose, D-mannose, N-acetyl-glucosamine, amygdalin, esculin, salicin, cellobiose, maltose, trehalose, and beta gentiobiose. In a preferred embodiment, the euhygienic bacterial growth broth is maintained at a temperature of between 5° C. and 35° C. The resulting euhygienic bacterial broth preferably has a pH of between about pH 4.1 and about pH 4.6.

As used herein, the term "competitive inhibition" means the inhibition of growth of undesired bacteria by creating an environment where euhygienic bacteria can competitively assimilate sugars and proteins present on a meat surface and thus, proliferate to effectively exclude the growth of undesired bacteria. The term "inhibition" as used herein, means the killing of a microorganism, such as an undesired bacteria, or the control of the growth of a microorganism. As used herein, the term "exclusion" means the crowding out of one microorganism by another. The terms "inhibition" and "exclusion" are collectively used herein to mean the mechanism by which the growth of undesired bacteria is controlled to allow for the growth and proliferation of euhygienic bacteria.

Under one theory of how competitive inhibition operates, one type of bacteria is able to competitively inhibit the growth of other forms of bacteria by effectively proliferating to such an extent that other forms of bacteria are unable to contact the food surface. Because the growth of bacteria requires access to the surface of food in order to assimilate sugars and proteins thereon, bacteria first able to multiply and occupy the surface of a food product can effectively preclude the growth of other forms of bacteria. Thus, to be effective in the present invention, euhygienic bacteria must be able to grow and multiply fast enough to substantially colonize a food surface before undesired bacteria are able to significantly proliferate on the same surface. By using the present method, euhygienic bacteria are allowed to multiply, crowd out, and thereby exclude the growth of undesired bacteria, thereby preventing the spoilage and pathogenic infection of food.

In accordance with one embodiment of the present invention, meat is inoculated with an effective amount of euhygienic bacteria able to competitively inhibit and/or exclude the growth of pathogenic and spoilage bacteria. In this embodiment, the euhygienic bacteria used a facultative, sacrophilic, mesophilic gram positive bacteria. More particularly, the present invention includes the use of euhygienic bacteria that are non-spoilage, non-pathogenic and acidophilic, thriving in an environment with a pH of about pH 4 to about pH 5. While various euhygienic bacteria can be selected for use, preferred euhygienic bacteria include homofermentive bacteria able to produce either lactic acid or acetic acid as by-products of their glycolytic processes. Such euhygienic bacteria are thus able to create an environment favorable to their continued proliferation but unfavorable to the growth of undesired bacteria, i.e. Spoilage and pathogenic bacteria.

Preferably, a desired euhygienic bacteria is selected from the genus Lactobacillus, and even more preferably from one or more of the following species: *L. delbrueckii, L. leichmannii, L. jensenii, L. lactis, L. bulgaricus, L. helveticus,* and *L. acidophilus.* In the most preferred embodiment of the invention, *L. delbrueckii* is the predominant desired bacteria. It is known that *L. delbrueckii* exists in several subspecies and the present invention includes the use of all subspecies, mutations, and genetic alterations to *L. delbrueckii.*

Inoculation with euhygienic bacteria is preferably performed subsequent to other bacterial control measures being taken, for example, after dehairing the animal, applying an acetic acid spray wash, applying antimicrobial agents or after irradiating the food. Under proper environmental conditions, euhygienic bacteria proliferate and colonize the food surface, and in so doing, create a pH environment favorable to the continued competitive growth of the euhygienic bacteria.

While not intending to be bound by theory, it is believed that one of the ways in which certain euhygienic bacteria act to extend the shelf life of meat is by lowering the pH on the surface of the meat to create a slightly acidic environment. The lowering of the pH on the surface of the meat creates an environment favorable to the growth of the euhygienic bacteria, but unfavorable to the growth of undesired bacteria. Thus, once a colony of euhygienic bacteria, such as *L. delbrueckii*, is established on the surface of a meat product, other forms of bacteria are effectively precluded from multiplying or are killed by the acidic environment produced by the euhygienic bacteria.

In another embodiment of the invention, the inoculation of meat with euhygienic bacteria is done in combination with the inoculation of a food product either with antibiotics or with antibiotic producing bacteria, for example, *Streptococcus Lactose* or Pediococcus. Such bacteria are known to generate antibiotics toxic to spoilage and pathogenic bacteria. These later bacteria are capable of producing antibiotics toxic to undesired pathogenic and spoilage bacteria, but that are not toxic to euhygienic bacteria. It is also within the scope of the present invention that a euhygienic bacteria may be genetically engineered to acquire certain antibiotic properties. Thus, inoculation with such an euhygienic bacteria may actively kill certain undesired bacteria while proliferating on the surface of a food product to effectively inhibit and/or exclude the growth of other undesired bacteria.

In another embodiment of the invention, the euhygienic bacteria used is a gram negative, sacrophilic, mesophilic, thermophilic bacteria, effective to competitively inhibit the growth of spoilage and pathogenic bacteria. In a particular embodiment of the present invention, an euhygienic bacteria of the genus Hafnia and more preferably from the species *alvei* is used either independently or in conjunction with *L. delbrueckii.*

Although not intending to be restricted by current theory, it is believed that *L. delbrueckii* bacteria may be present on meat surfaces in a symbiotic relationship with other commensal euhygienic bacteria. For example, *L. delbrueckii* may proliferate on meat surfaces with *Hafnia Alvei* in such a relationship. Although *Hafnia Alvei* is known to be a common bacteria, a sub-species of *Hafnia Alvei* is known to be capable of relatively rapid growth at temperatures of about 5° C. Under one theory, *Hafnia Alvei* initially colonizes the surface of a food product to create an environment conducive to the growth of *L. delbrueckii.* Therefore, the present invention includes the inoculation of meat with either *Hafnia Alvei* or *L. delbrueckii,* or a combination thereof, in order to competitively inhibit and exclude the growth of undesired pathogenic and spoilage bacteria.

In a preferred embodiment, euhygienic bacteria such as *L. delbrueckii* bacteria is contacted with an animal carcass after the animal has been through one or more bacterial control measures to reduce the number of bacteria on the meat surface. For example, after an animal has been dehaired and its carcass has been conveyed through an acetic acid spray wash, the carcass is inoculated with an effective amount of the euhygienic bacteria, *L. debrueckii.* In such a manner, the inoculation with *L. delbrueckii* is more effective in inhibiting the growth of undesired bacteria due to the reduction of other bacteria on the meat surface.

Certain acidophilic euhygienic bacteria, such as lactobaccillium, are known to grow well in acidic environments having pH ranges from 3 to 7. Fresh meat is known to have a pH of about 5.3 to about 7. At pH levels of about 4.5 the majority of spoilage and pathogenic bacteria are either killed or their growth is severely inhibited and/or arrested. Contacting fresh meat with an effective amount of a weak organic acid, such as acetic or lactic acid, lowers the pH of the meat from about pH 3 and about pH 5 and preferably to about 4, thereby reducing the vast majority of non-acidophilic bacteria and creating an environment more conducive to the promoting the growth of acidophilic euhygienic bacteria. The acidification of the surface of red meat also has other beneficial effects. Organic acids act to maintain meat in a reduced state, thereby maintaining a desirable red color of the meat. The present invention therefore includes a method for creating an acidic environment on the surface of a meat product favorable to the growth of acidophilic euhygienic bacteria.

It is to be understood that inoculation of ground food products may entail contacting euhygienic bacteria with portions of the food product which will not be necessarily "on the surface" of the food product. It is believed that euhygienic bacteria, even when present on the interior of a food product, such as ground beef, promotes the competitive inhibition and/or exclusion of the growth of undesired bacteria. It is further believed that the use of euhygienic bacteria is particularly useful in ground meat products incorporating vegetative matter, such as oat flour.

The present invention also includes an unique method for tenderizing meat whereby meat is allowed to age for an extended period of time without spoiling. The aging of meat permits enzymes present in meat to degrade meat fiber, thus making the meat more tender. The freezing of meat retards or ceases such enzymatic activity. Irradiation of meat similarly destroys or retards enzymatic reactions that would otherwise occur. The present invention, because it allows for the maintenance of meat in a refrigerated environment for an extended period of time without spoiling, permits the natural enzymatic aging of the meat to proceed, producing meat of increased tenderness. In one embodiment of the present invention, meat is inoculated with an effective amount of euhygienic bacteria to inhibit and/or exclude the growth of undesired bacteria for a period of time sufficient to permit the natural enzymatic aging of meat without any coincidental spoilage of the meat.

Another aspect of the present invention includes exposing euhygienic bacteria to a meat processing facility, or the equipment used in such a facility subsequent to the effective sterilization of such facility and/or equipment. In such a manner, the general environment of the meat processing facility is effectively exposed to or inoculated with euhygienic bacteria in order to competitively inhibit and/or exclude the growth of undesired pathogenic and spoilage bacteria. In this way, for example, the risk of unintended contact between meat products and undesired bacteria is kept to a minimum and the opportunity for undesired bacterial infection of meat is vastly reduced. The exposure or inoculation of a food processing facility with euhygienic bacteria can be accomplished in any manner which effectively reduces the risk of unintentional infection of a food product with undesired bacteria. This can be accomplished, for example, by first effectively sterilizing a food processing facility, or the equipment therein, by applying to the facility and equipment effective amounts and concentrations of organic acid solutions and/or other sanitizers, such as, but not limited to, chlorine, quaternary ammonia, and iodine based agents. After such sterilization, the facility and equipment therein is inoculated with an effective amount of euhygienic bacteria to inhibit and/or exclude the growth of undesired bacteria.

It is to be expressly understood that the present invention can be used in combination with other bacterial control procedures. In particular, the dehairing of animals, or the spraying of animal carcasses with organic acid solutions, prior to the dispatching and slaughtering of such animals can be used to initially reduce the number of bacteria present in the meat slaughtering facility. Moreover, sanitation measures including the sterilization of knives used in the slaughtering process, changing of worker's gloves on a periodic basis during the slaughtering operation, disinfecting of slaughtering lines and maintaining personal hygiene requirements for workers, assists in the control of undesired bacteria proliferation. By using the present invention in combination with such other sanitation measures, and by maintaining meat in an environment cooled to about −1° C.-7° C. after the vacuum packing of the meat in plastic bags, it has been found that the shelf life of meat can be extended for up to 150 days without unacceptable growth of spoilage and pathogenic bacteria. The general object of the present invention is thus to create an environment that selectively favors the growth and proliferation of euhygienic hygiene bacteria over the growth of undesired bacteria.

In one embodiment of the invention, a second inoculation with euhygienic bacteria is performed prior to the final packaging of meat products in oxygen impermeable wrapping such as a plastic bag. In this embodiment, meat is placed in plastic bags, contacted with euhygienic bacteria, and ambient air is then vacuumed from the bag and the bag is sealed. In such a manner, euhygienic bacteria colonize the meat within the substantially anaerobic environment of the vacuum packed bag. Food products, such as meat, treated and packaged as described above, can be placed in a refrigerated environment to further extend the shelf life of the food product.

In another embodiment of the invention, a food product first inoculated with euhygienic bacteria is maintained in a temperature environment cooled to between about −1° C. to about 7° C., more preferably between about 1° C. and 6° C., and most preferably between about 2° C. and 5° C. It is preferable to maintain meat at a temperature above the approximate freezing point of meat (about −2.5° C. to about −3° C.) in order to avoid the damage caused by freezing meat and to avoid the killing or severe retardation and/or arrestation of euhygienic bacterial growth and proliferation. It will be appreciated that variations in temperature and periods of exposure may be utilized. However, lower temperatures and longer periods of exposure produce a greater depth of temperature penetration of the meat product and detract from the product quality. The present invention also includes the inoculation of food products with euhygienic bacteria genetically altered to grow and proliferate in low temperature environments.

In some situations, the packaging of a food product may be necessary for the present invention to be used effectively, i.e., in order that euhygienic bacteria may effectively colonize the food product. For example, dependent upon several factors, including but not limited to the kind of undesired bacteria in the ambient environment, the type of food product, and other environmental conditions, a food product may require packaging in an oxygen impermeable plastic bag subsequent to inoculation with an effective amount of euhygienic bacteria. In general terms, environmental conditions must be created and maintained so that the natural selection and growth of euhygienic bacteria is favored over that of undesired bacteria.

The present invention also comprises food products made in accordance with the various embodiments of the above-described method. In particular, the present invention includes a meat product having a shelf life of over about 40 days produced in accordance with the method comprising the inoculation of meat with an effective amount of euhygienic bacteria to competitively inhibit the growth of pathogenic or spoilage bacteria. The euhygienic bacteria are preferably selected either from the genus Lactobacillus and more preferably from the species *L. delbrueckii*, or from the genus Hafnia, and more preferably from the species *alvei*. In one embodiment, the meat is maintained in storage at a temperature environment of between about −1° C. and 7° C., more preferably between about 2° C. and 7° C., and most preferably between about 3° C. and 5° C.

Meat produced in accordance with the above-described method retains the color and odor characteristics associated with fresh meat for an extended period of time, such time period extending up to about 150 days from the date the animal was slaughtered. Because conventional methods of fresh meat processing do not allow for meat shelf life of over about 30 to 40 days, numerous foreign markets for fresh domestic meat products remain effectively closed. Access to foreign fresh meat markets, for example, those of the Pacific Rim countries and Europe, necessitate the costly shipping of domestic meat products by air in order to have such products sold before spoilage occurs. The present invention extends the shelf life of fresh meat and meat by-products for up to about 150 days or more without the undesired proliferation of spoilage or pathogenic bacteria. Because of this extended shelf life, foreign markets for domestic fresh meat products are made accessible, allowing for the economic shipment of fresh meat by boat, rather than by airplane.

The following test results are provided for purposes of illustration and are not intended to limit the scope of the invention.

EXAMPLES

Example 1

An animal was slaughtered in a process in which the animal was first stunned, de-haired, ex-sanguinated, dehided, conveyed through an acetic acid spray wash (acetic acid present in a 0.5-1.5% solution) and fabricated. After application of the acetic acid spray, the animal carcass was sprayed with a diluted solution containing *L. delbrueckii* bacteria formulated by growing *L. delbrueckii* in 750 ml of growth broth for 24 hours at a temperature of 35° C. and diluting the resulting solution to attain a 1 part in 10 solution. Meat from the animal carcass was then vacuum packed in a plastic bag to remove essentially all oxygen and the bag was heat sealed. The meat was stored in a temperature environment of about 5° C. for 150 days. After 150 days, the bag was opened and a total bacterial plate count was performed. An analysis of the bacteria present on the meat was performed indicating that *L. delbrueckii* bacteria had essentially colonized the entire meat surface. The meat had color characteristics similar to meat that had been slaughtered in a conventional fashion and refrigerated at 5° C. for less than 30 days.

Example 2

While various embodiments of the present invention have been described in detail, it is apparent that modifications and adaptations of those embodiments will occur to those skilled in the art. However, it is to be expressly understood that such modifications and adaptations are within the scope of the present invention as set forth in the following claims.

What is claimed is:

1. A method for preserving a food product, comprising the steps of:
   reducing the number of bacteria on a food product, wherein said step of reducing comprises dehairing an animal to be slaughtered prior to dispatching said animal and applying an organic acid to said animal;
   inoculating the surface of the food product with an effective amount of non-spoilage and non-pathogenic bacteria effective to competitively inhibit the growth of pathogenic and spoilage bacteria;
   maintaining said food product in a temperature environment that selectively favors the proliferation of said non-spoilage and non-pathogenic bacteria; and
   packaging the food product in a substantially oxygen impermeable package.

2. A method for preserving a meat product, comprising:
   dispatching an animal;
   de-hiding an animal;
   contacting said animal with an organic acid solution;
   inoculating meat from said animal with an effective amount of non-spoilage and non-pathogenic bacteria to competitively inhibit the growth of spoilage and pathogenic bacteria, said step of inoculating said meat performed subsequent to said step of contacting said meat with said organic acid solution; fabricating said animal;
   vacuum packaging said fabricated animal meat in a plastic bag.

3. A method for preserving a food product, comprising:
   (a) reducing the total number of bacteria on a food product to below about 5,000 microorganisms per gram of food product; and
   (b) inoculating the food product with an amount of non-spoilage and non-pathogenic bacteria to inhibit the growth of spoilage and pathogenic bacteria, wherein said non-spoilage and non-pathogenic bacteria do not produce commercially unacceptable amounts of metabolic byproducts selected from the group consisting of carbon dioxide, methane, nitrogenous compounds, butyric acid, propionic acid, lactic acid, formic acid, sulfur compounds, and mixtures thereof.

4. A method for preserving a food product comprising:
   (a) cleaning said food product to remove spoilage and pathogenic bacteria present on said food product from said food product;
   (b) colonizing said food product with non-spoilage and non-pathogenic bacteria to an extent effective to competitively inhibit the growth of spoilage and pathogenic bacteria on said food product; and
   (c) packaging the food product in a substantially oxygen impermeable package to prevent infection of said cleaned and colonized food product with spoilage and pathogenic bacteria.

5. The method of claim 4, wherein said non-spoilage and non-pathogenic bacteria are homofermentive, gram positive Lactobacillus bacteria able to proliferate at temperatures from about −1° C. to about 35° C.

* * * * *